Feb. 28, 1967  H. M. SCHAPPERT  3,306,889
ETHYLENE POLYMERIZATION
Filed May 15, 1963  3 Sheets-Sheet 2

INVENTOR.
HANS M. SCHAPPERT
BY Olin E. Williams
his Attorney

Feb. 28, 1967  H. M. SCHAPPERT  3,306,889
ETHYLENE POLYMERIZATION
Filed May 15, 1963  3 Sheets-Sheet 3

INVENTOR.
HANS M. SCHAPPERT
BY Olin E. Williams
his Attorney

United States Patent Office 3,306,889
Patented Feb. 28, 1967

3,306,889
ETHYLENE POLYMERIZATION
Hans M. Schappert, Bethel Park, Pa., assignor to Koppers Company, Inc., a corporation of Delaware
Filed May 15, 1963, Ser. No. 280,527
1 Claim. (Cl. 260—94.9)

This invention relates to an improved process for polymerizing ethylene. The invention has particular reference to an improved process for the continuous polymerization of ethylene at high reaction pressures.

Ethylene is conveniently polymerized under high pressures in the presence of a free radical catalyst to a normally solid polyethylene. The high pressures may range from about 17,000–40,000 p.s.i. and the free radical yielding catalysts normally used include oxygen, peroxides such as benzoyl and di-t-butylperoxide, and azo compounds. The amount of catalyst is generally small; in the case of oxygen, for example only 25–60 parts per million is introduced with the ethylene. The ethylene monomer must be heated to a temperature of about 170–190° C. to initiate polymerization.

In carrying out the polymerization of ethylene under high pressure, ethylene is introduced into a conventional tubular reactor consisting of a series of small diameter tubes comprising about 16 in number, each tube about 33 feet long connected in series having return bends and being horizontally arranged. An average of 10–16 percent of the ethylene fed to the reactor is converted to polyethylene per pass. A majority of the nonconverted ethylene, 90–84 percent, is reused by recycling the gas partly at an elevated pressure and partly at a low pressure. The recycle of the non-converted ethylene gas using elevated pressure results in a great saving in investment and energy because the compression of ethylene in the lower pressure range is energy consuming.

In preparing the ethylene feed gas for polymerization within the "tubular reactor" the ethylene is compressed in multistage compressors of conventional design. A typical commercial unit consists of two electrically driven compressors—a six stage low pressure compressor commonly called a "precompressor" and a two stage high pressure compressor commonly called a "hypercompressor." In practice, fresh ethylene and recycle ethylene under low pressure is introduced into the precompressor and is compressed to discharge pressure. This gas at discharge pressure is mixed with recycle ethylene at high pressure and, by suitable conveying means, introduced into the hypercompressor wherein the gas is further compressed to the desired polymerization reaction pressure.

During the continuous polymerization of ethylene a conversion to polymer of about 14 percent of the original one hundred percent ethylene occurs in the continuous cycle and polymer in this amount is removed by means of separators known as "catch pots." To maintain the continuous polymerization, fresh ethylene in an amount of about 18 percent and low pressure recycle gas of about 12 percent are compressed in the precompressor up to the amount of pressure of the high pressure recycle gas. The high pressure recycle system delivers the remaining 70 percent of the feed from that monomer which did not convert during the preceding cycle. About four percent of recycled gas is removed as off gas to stabilize the impurities concentration in the reactor feed. After combining the low pressure feed stream with the high pressure recycle feed stream, a total of 100 percent ethylene is again compressed in the hypercompressor to reactor pressure.

Because the high pressure polymerization process as practiced is a continuous process, it is necessary for efficiency of operation and maximum product output that the temperature of the gas entering the hypercompressor be as low and constant as possible in order to provide a high, uniform compressor capacity, thus permitting a high rate of polymer production per unit reaction volume and uniform product quality.

The various types of cooler design and arrangements heretofore known have not provided satisfactory cooling for the recycled gas. For example, there is used during the cycle step which returns the high pressure recycle gas to the hypercompressor, a series of five separate cooling units. This number may vary depending upon the cooling desired. Each cooling unit or cooler consists of five jacketed tubes about 15 feet in length connected in series. For continuous polymerization using reaction pressures of 22,000 p.s.i.g. the high pressure recycle gas representing some 70 percent of the hypercompressor capacity must be cooled from a temperature of about 250° C. to a temperature of about 23° C. before the gas enters the hypercompressor suction inlet. The high pressure recycle gas contains some amount of low molecular weight polymer commonly called "wax fractions" which after a short period of continuous operation tend to solidify and remain on the inner wall of the cooling units. Generally, the two hottest coolers, e.g., those nearest the catch pot are cooled with tempered water of about 70° C. The following two coolers are maintained with service water of about 30° C. and the last unit contains chilled water of about 10° C. The coolers at the beginning of the continuous polymerization operation are clean and the temperature of the gas leaving the fourth cooler unit is about 45° C. and that leaving the fifth or the last unit is about 30° C. Water temperatures obviously depend upon reaction conditions and upon compressor and reactor capacities.

During the early cycles of polymerization the temperature of the gas stream after mixing, that is, the precompressor discharge stream which is in an amount of about 2000 lbs./hr. at 16° C. and the high pressure recycle gas stream in the amount of about 4000 lbs./hr. at 30° C. temperature averages about 23° C. Under these operating conditions, a steady output of polymer will occur and the entire unit operates in an efficient manner. However cooling the high pressure recycle gas causes the wax fractions which are not totally removed during the continuous cycle, to collect as polymer on the interior walls of the coolers as the fractions reach solidification temperatures.

This occurrence of solid wax formation on cooler walls is better understood by way of practical illustration. When recycle ethylene under pressure of 4000 p.s.i.g. and at a temperature of 220° C. containing wax fractions in solution is to be cooled to 20° C. prior to compression to reactor pressure, and the wax fractions will have, for example, a continuous melting point curve throughout the temperature range from 100° C. to 0° C., the first fraction of waxes will condense, during cooling of the ethylene, at about 90° C. After the gas is further cooled to about 80° C., the condensed wax solidifies. Thus, the solidification continues in this manner through the cooling units.

The outlet temperature of the cooling units increase steadily as a result of the thermal resistance created by the wax coating, thus reducing the cooling effect of the cooled water flowing through the coolers. For example, after ten days the temperature of the gas out of the final cooler will increase from 30° C. temperature obtained on the first day of operation to about 58° C. and the temperature of gas leaving the preceding cooler may increase, for example, from 45° C. to 65° C. As a result the inlet conditions of the hypercompressor, that is pressure and temperature change.

We have found in carrying out the continuous polymerization cycle that it is very important and necessary that the inlet conditions of the hypercompressor remain constant. If temperature of the gas entering the compressor is fluctuating during any cycle, the hypercompressor capacity will also fluctuate which will in turn upset the stability of the reactor resulting in lower output per hour and in an off specification product. It is also known that this prior cooling method which eventually results in poor output and poor specification product will also require a change in the catalyst addition at the beginning of the polymerization cycle in order to meet varying reactor conditions and maintain polymer quality.

To prevent the inefficient operation and degradation of polymer it has heretofore been necessary to discontinue the continuous polymerization operation frequently to clean the fouled coolers containing the low molecular weight waxes. This discontinuation is intolerable if efficient operation is to be maintained. Even with cleaning, the same problem becomes existent again after a short period of continuous recycle.

It has previously been suggested that the problem of fouling and the problem of maintaining constant temperature and pressure in the hypercompressor may be overcome by applying a fractionated cooling method. In this method, the cooler is subdivided in several sections whereby cooling water of a higher temperature level is used in the very hot section of the cooler and water of increasingly lower temperature level is used in the colder sections. This procedure does decrease somewhat the rate of fouling but the colder sections of the cooler are still subjected to fouling by waxy polymer. It has also been suggested that a solvent be used to remove low molecular weight polymer during the recycle process. This procedure however is extremely expensive and would decrease rather than enhance the efficiency of the continuous polymerization cycle. Another suggested solution for preventing the wax formation in the cooling system from creating fluctuations in temperature and pressure in the hypercompressor is based on the fact that ethylene coming from the precompressor and consisting of fresh ethylene and low pressure recycle gas is practically free of low molecular weight polymer so that the outlet of the precompressor can be cooled to any desired low temperature, e.g., 0° C. A mixing therefore of the streams from the precompressor and from the high pressure recycle system will decrease the temperature of gas entering the hypercompressor. However, the mixing temperature would steadily, at a perhaps lower rate, increase with the undesirable result hereinabove described being obtained. Additionally, such a procedure is disadvantageous because the smaller part of the feed coming from the precompressor would need an extremely low temperature to effectively lower the temperature of the mixed gas stream. Energy output required to lower the temperature would decrease any gain made in efficiency.

It is therefore an object of this invention to increase the efficiency of a continuous ethylene polymerization reactor system to provide higher output of product while maintaining a desired product control. Another object of the invention is the provision of an improved continuous ethylene polymerization process employing cooling means whereby the gas entering the hypercompressor is at a low temperature to provide for a high compressor capacity while simultaneously maintaining the gas temperature constant to thereby maintain a uniform capacity for the hypercompressor.

This invention provides a novel process wherein a constant compressor capacity and a constant temperature of gas entering the compressor is maintained to thereby provide for efficient production of polymer in a continuous polymerization process.

Briefly, the invention comprises an improvement in a process for continuous polymerization of ethylene under high pressure wherein unreacted ethylene is recycled partly at high pressure and partly at low pressure and whereby a constant compressor capacity and a constant conversion of ethylene to polyethylene is obtained by the addition of cooling means at loci intermediate of the hypercompressor and the mixing zone of the high pressure recycle gas stream and the low pressure gas delivery stream which latter contains fresh ethylene. The cooling process and means thus provide a constant temperature in the mixed gas stream as said stream enters the hypercompressor for compression to reactor pressure conditions.

Several advantages arise from the practice of this invention. The total flow of ethylene passing through the reactor tubes is increased thereby increasing the production rate of polyethylene during the continuous polymerization cycle. Also by the practice of this invention the reactor control is simplified since it is no longer necessary to control or vary the amount of catalyst during any of the continuous runs of the reactor system.

The practice of this invention enables the reactor system to be operated without temperature or pressure fluctuations and therefore the throughput of the reactor is stable thus improving the product quality.

In the practice of this invention using the cooling means located after the point of mixing of the high and low pressure recycle delivery system, most of the low molecular weight polymer can be removed from the recycled ethylene thus improving product quality. For example, it is possible to use a higher temperature cooling water in the novel cooling means so that the fractions of low molecular weight polymer will not deposit on the cooler walls. The non-deposited polymer is then carried and pushed by the relatively dense gas toward the outlet of the cooler and thus removed in a conventional trap normally associated with the cooling means. Thus paradoxically a better cooling effect results using the warmer water because most of the low molecular weight polymer is removed to thereby favorably influence the quality of the final polymer product.

The above and further advantages and novel features of the invention will appear more fully from the following detailed description when the same is read in connection with the accompanying drawings. It is to be understood however that the drawings are not intended as a definition of the invention but are for the purpose of illustration only.

In the drawings wherein like parts are marked alike:

Figure 3:
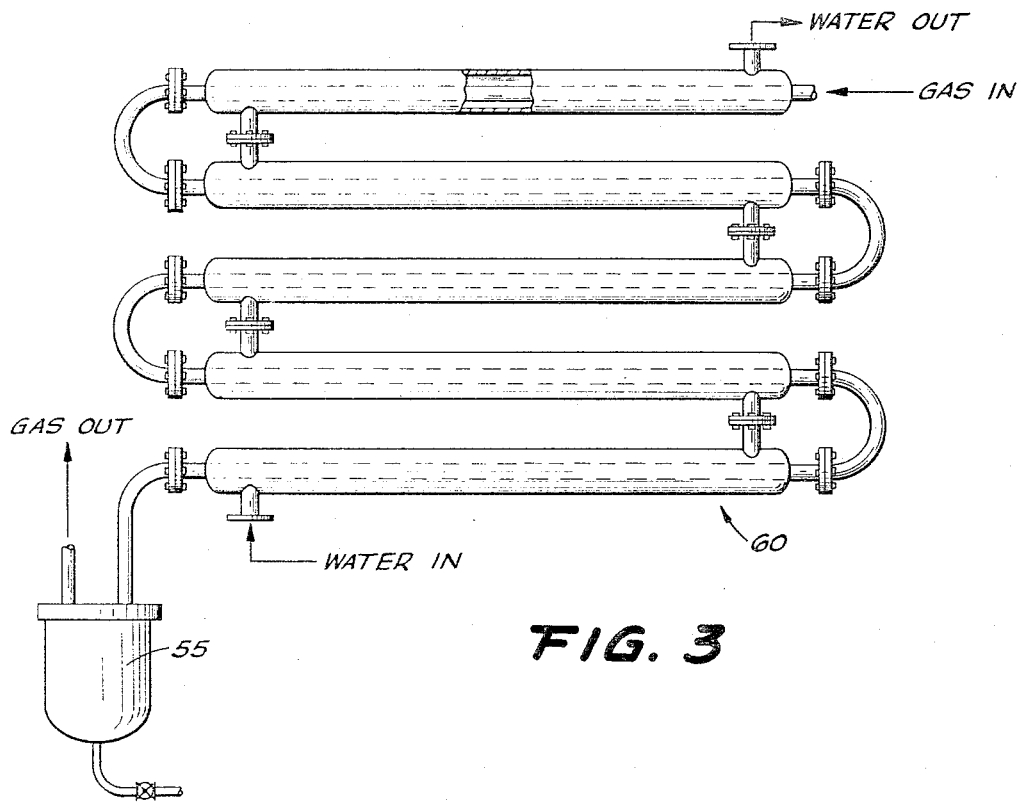
Figure 4:
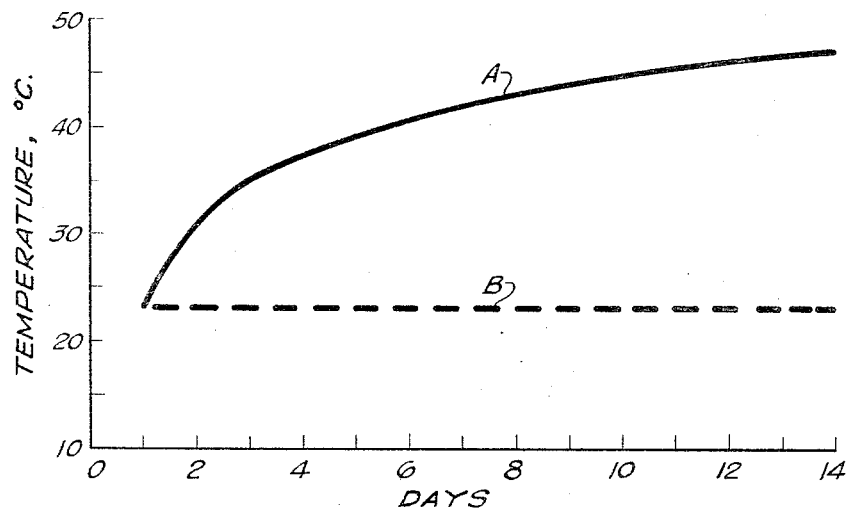

FIGURE 3 schematically illustrates a cooler useful for controlling the temperature of recycle gas during polymerization; and FIGURE 4 is a graph showing the various gas temperatures upon entry and exit from the cooling means of this invention.

Figure 1:
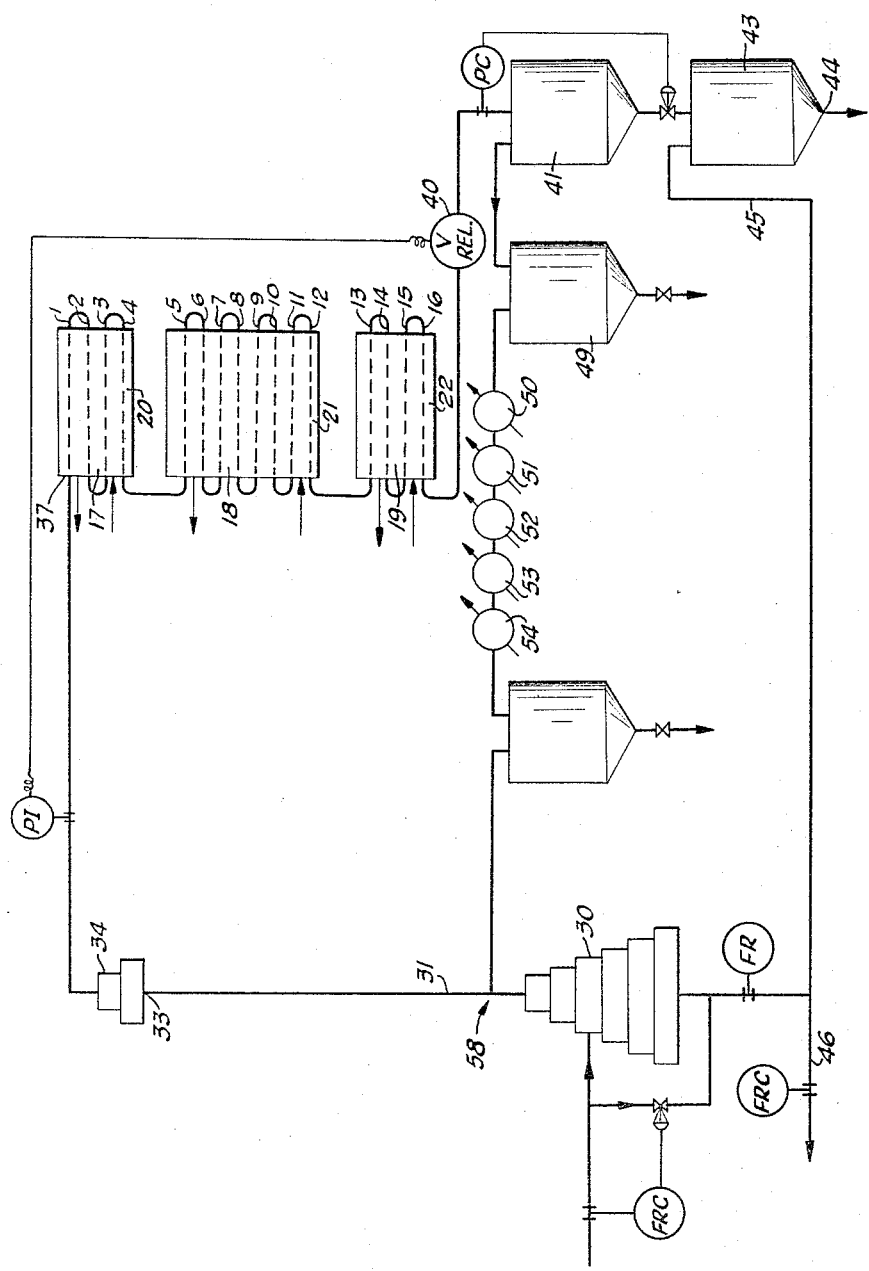
FIGURE 1 represents a schematic diagram of the continuous polymerization process using the cooling system of the prior art.

Referring now to FIGURE 1, a tubular reactor for the polymerization of ethylene is comprised of a series of tubes 1–16. These tubes are arranged into sections 17, 18, and 19 of horizontally parallel tubes connected in series to constitute a continuous tube.

Surrounding each section of the reactor is a jacket 20, 21, and 22 through which cooling water is circulated. The temperature of the water circulated in jacket 20 of the first section 17 is lower than the polymerization initiating temperature; the temperature of the water circulated in jacket 21 of the central section 18 is higher than that in jacket 20; and the temperature of the water circulated in jacket 22 surrounding the last section 19 is lower than the temperature of the water in jacket 21. For those persons skilled in the art of ethylene polymerization the first section 17 is known as the "preheater section," section 18 as the "reaction section" and section 19 as the "cooling section."

In the operation of the continuous polymerization cycle, fresh ethylene containing a free radical yielding catalyst is fed into a 6-stage precompressor 30 and is compressed therein up to discharge pressure. The compressed gas is discharged from compressor 30 through line 31 into a standard double tube heat exchanger (not shown) wherein the temperature of the gas is cooled to about 16° C. The cooled gas then flows to the inlet 33 of the hypercompressor 34 which inlet has a constant speed of 143 r.p.m. The gas containing catalyst is then compressed in the 2-stage hypercompressor 34 to maximum pressure and is then fed to preheater section 17 of the reactor, under high pressure through inlet 37 where the gas is heated by the circulating water in the preheater section 17.

By the time the ethylene and catalyst reach the reaction section 18 of the reactor, polymerization of the ethylene will have been initiated. This polymerization continues through section 18. The unreacted ethylene and polymer as a mixture flow into the cooling section 19 where the cooler water circulating through jacket 22 cools the mixture. The mixture of ethylene gas and polymer are intermittently released through valve 40 into high pressure, hot catch pot 41 where most of the unconverted gas, that is about 4,000 pounds per hour is removed at the top of the high pressure recycle system. Thereafter polymer together with unreacted ethylene is led to the low pressure catch pot 43 from which the polymer is removed for further processing through exit 44. The low pressure recycle gas remaining in low pressure catch pot 43 is partially recycled to the precompressor through line 45 wherein it is combined with fresh ethylene and catalyst and recycled to the precompressor 30 for further mixing with high pressure recycle gas to be fed to the reactor to continue the process. Another portion of the low pressure gas is removed as off gas through line 46 to provide primarily for the removal of impurities from the system before another continuous polymerization run occurs. The high pressure recycle gas which remained in the high pressure catch pot 41 is cooled from a temperature of about 250° C. to the lowest possible temperature. The cooling is accomplished in five separate cooling units, 50, 51, 52, 53, and 54. Each unit, one of which is shown schematically in FIGURE 3, consists of five jacketed tubes 60. Each tube is 15 feet long and connected in series having a conventional trap 55 associated therewith. The two hottest coolers 50 and 51 are served with tempered water of 70° C. The following two coolers 52 and 53 are serviced with service water of 30° C. and the last unit 54 contains chilled water of 10° C. Prior to cooling, the gas under high pressure is circulated through hot trap 49 to remove further polymers.

The coolers at the start of the continuous cycle are clean and the temperature of the gas leaving the fourth unit 53 is normally 45° C. and the high pressure recycle gas passes through the coolers at a rate of about 4,000 pounds per hour. The gas leaving final cooler 54 mixes with the gas stream from the precompressor 30 comprised of low pressure recycle gas and fresh ethylene gas to thus further cool the gas prior to compression in the hypercompressor. The temperature of the fresh and recycled low pressure recycle gas prior to mixing with the high pressure recycle gas is about 16° C. After the two streams mix the temperature of the gas entering the high pressure hypercompressor is about 23° C. Under these conditions, the capacity of the hypercompressor amounts to about 6,000 pounds per hour. After continuous operation, the coolers 51–54 in the high pressure recycle system begin to fail as a result of the deposition on the cooler walls of low molecular weight polyethylene which is contained in the high pressure recycle gas. This deposition of low molecular weight polymer on the cooler walls results in a higher gas temperature for the ethylene leaving the final cooler because thermal resistance of the deposited wax prevents the cooling water from lowering the temperature of the recycle gas to the 30° C. originally obtained. For example, after ten days of continuous operation the temperature of gas leaving cooler 54 may be increased to 58° C. Therefore when the high pressure recycle gas is combined with the precompressor discharge gas which is at a steady temperature of 16° C., the temperature of the combined streams entering the hypercompressor is about 46° C. Consequently, the hypercompressor discharge decreases which automatically reduces the high pressure recycle flow. With the increasing final cooler outlet temperature, more and more low molecular weight material is recycled to the reactor which disadvantageously affects product quality.

In accordance with this invention, the deleterious effect of waxy polymer deposition in the conventional coolers is compensated for and removed and the temperature of the gas stream entering the hypercompressor 34 is maintained at a constant desired level by cooling means 61 (shown on FIGURE 2) which are placed at loci between the precompressor 30 and the hypercompressor 34 which loci is subsequent to the mixing zone 58 of the low pressure gas stream and the high pressure recycle gas stream.

The temperature control for the gas stream being injected into the hypercompressor may be accomplished by cooling means 61. Cooling means 61 located subsequent to the mixing zone of the two gas streams is cooled with water of about 10° C. flowing through a cooling jacket countercurrent to the flow of the gas under pressure. After 10 days continuous operation, the gas outlet temperature of cooler 54 is about 45° C. After mixing, the combined gas stream temperature is about 35° C. The mixed stream flows through cooler 61 which is provided with chilled water and upon exit from the cooler 61 the temperature of the gas before entry into the hypercompressor is 23° C. Unexpectedly, this outlet temperature of the gas leaving cooler 61 will remain constant during further operation providing for maximum capacity for the hypercompressor. This effect is better illustrated in FIGURE 4 wherein the gas inlet temperature of the cooling means of this invention is shown increasing and the outlet temperature of the gas entering the hypercompressor is shown to remain constant.

It is understood that the cooling temperature, gas temperature, recycle flow rates and the like as used in the foregoing description will vary according to the size of the reactor, reaction pressures and reactor capacities. A unique and unexpected result occurs because of the new cooling means and the location thereof at a point subsequent to the mixing zone of the low and high pressure gas streams.

This novel effect is achieved because of the novel cooling means and process in relation to the mixed gas streams. This effect is totally unexpected. The mixing of the high pressure recycle stream containing the large amount of low molecular weight polymer with the low pressure gas stream, free of such material, will provide a combined stream from mixing wherein the combined stream is less saturated with low molecular weight polymer than the original high pressure recycle stream of high impurity. Because of lower saturation in the mixed stream it now becomes possible to apply a cooling water in the novel cooling means and in its particular location which cooling water does not solidify wax fractions as occurred in the previous coolers. As a result of this cooling, the diluted mixed gas stream will not have waxy polymer form as a solid since the formation of solid polymer from the gas stream depends upon a stepwise lowering of temperatures from cooler to cooler.

The effect of temperature on the low molecular weight polymer contained in the high pressure recycle gas stream is thus controlled by the novel process and cooling means of this invention. It has already been shown that the varying cooling temperatures of the prior art coolers will for any given high pressure recycle stream cause a deposition of waxy polymer onto each cooler. This deposition results when the high pressure recycle gas stream is cooled below the solidifying point for any impure waxy polymer which may be contained in the gas stream. Therefore, in each of the previously used coolers, a temperature drop from one cooler to another will remove as a solid, low molecular weight material having lower solidifying temperatures than those removed in prior coolers. This effect is overcome by the novel process of this invention because the novel cooler location and the temperature of the cooling liquid running countercurrently through the cooler never reaches a temperature low enough to cause deposition of low molecular weight polymer remaining in the gas stream subsequent to entry of the gas into the cooler of this invention.

These lower temperatures are never reached because the gas stream upon entering the additional cooler is dilute in content of polymer. Therefore in order to cause deposition of low molecular weight polymer a very low temperature of cooling liquid would be required. However, it is not necessary to maintain the temperature of the cooler of this invention below the temperature at which further low molecular weight material would deposit.

A novel and unique effect is created by the temperature maintained in the final cooling unit. Since this temperature does not vary to a great degree from the temperature of the gas stream entering the cooler, the polymer entrained in the gas stream is not cooled to a temperature at which the polymer will stick to the cooler walls resulting in polymer forming in the final gas stream of the final cooler. This polymer is then removed from the cooler by the relatively dense gas forcing the polymer to the trap 55 located below the cooler 61.

The following examples illustrate more fully this novel process for producing polyethylene.

*Example I*

Ethylene polymerization was conducted in the apparatus of FIGURE 1 exclusive of the novel cooling means of this invention. The inside diameter of all reactor tubes was 34 millimeters. Water at a temperature of approximately 160° C. circulated in jackets 17 and 19 and water at a temperature of approximately 210° C. was circulated in jacket 18. Ethylene of 99.9% purity and in an amount of 1200 pounds per hour in combination with 800 pounds per hour of low pressure recycle gas together wtih 3 cu. ft./hr. oxygen as catalyst were compressed in the 6-stage compressor from gas holder pressure of 20-inch water column up to 4000 p.s.i.g. discharge pressure. The gas removed from the precompressor has a temperature of 55° C. and is cooled in a standard double tube heat exchanger from 55° C. to 16° C. High pressure recycle gas in an amount of 4000 pounds per hour is cooled from 250° C. which is the temperature of the high pressure catch pot to the lowest possible temperature by conducting the high pressure gas stream through five jacketed coolers as shown in FIGURE 1. The temperature of the water running through the five coolers was as follows: 70° C. in coolers 50 and 51; 30° C. in coolers 52 and 53; 10° C. in cooler 54. The inside high pressure tube of the coolers has an internal diameter of 1¼ inch and a wall thickness to withstand the pressure of 4000 p.s.i.g. The gas flow is from top to bottom and the water flow is in countercurrent fashion from bottom to top. The temperature of the high pressure recycle gas stream as it exited from the last or the final cooling unit is 30° C. The combined gas stream has a temperature of 25° C. This mixture is then directed to the hypercompressor which is operating under a constant speed of 143 r.p.m. Under these conditions of pressure and temperature the hypercompressor capacity is equal to 6000 pounds per hour. The gas was compressed in the two stage hypercompressor up to 22,000 p.s.i.g. from whence the gas was fed for recycle to the reactor.

In this cycle of polymerization, polymer was produced at a rate of 840 pounds per hour, high pressure recycle gas was returned through the high pressure recycle gas system at a rate of 4000 pounds per hour and the capacity of the hypercompressor was 6000 pounds per hour.

For the purpose of illustrating the effect continuous operation has on cooler efficiency, the polymerization was continued for 10 days. After 10 days of continuous operation using the apparatus and conditions of Example I, the temperature of gas out of the final cooler 54 was 58° C. and the temperature of gas leaving the next to the last cooler 53 was 65° C. The mixing temperature of the two gas streams increased to 46° C. Consequently, the hypercompressor capacity was reduced to 5650 pounds per hour which caused the high pressure recycle flow to be reduced to 3650 pounds per hour. A decrease in production rate was also noted after the tenth day of operation. The production rate at the beginning of continuous polymerization was 840 pounds per hour and after the tenth day of operation the production rate had dropped to 790 pounds per hour.

*Example II*

Figure 2:
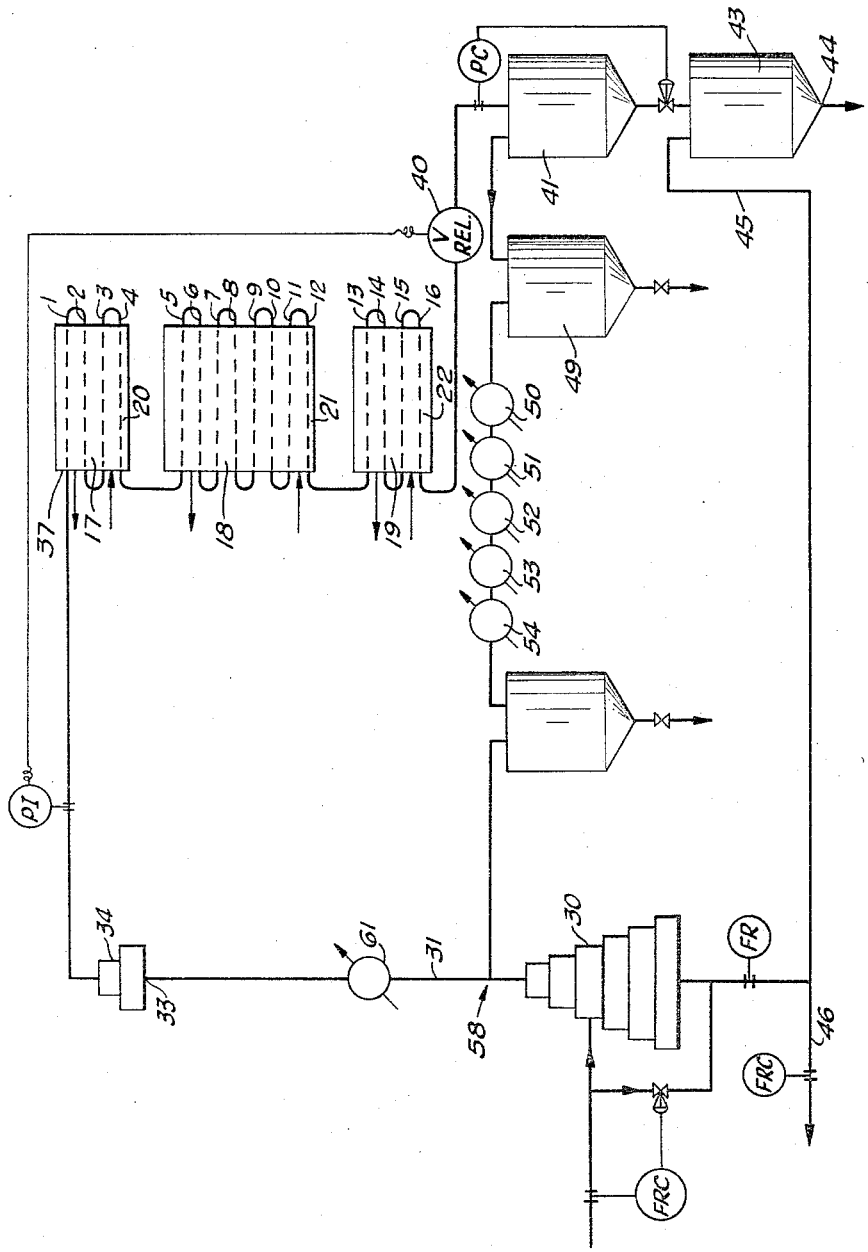
FIGURE 2 represents a schematic diagram of the process of continuous polymerization illustrating the novel feature of this invention using cooling means installed at loci beyond the mixing zone of the precompressor gas stream and the high pressure recycle gas stream.

The polymerization reaction was conducted again using the apparatus of FIGURE 2 including cooler 61 which was located in the position shown on the drawing. The dimensions of the reactor tubes and water temperature in the water jackets 17, 19 and 18 were maintained the same as those in Example I. All reaction conditions were identical to those described in Example I. The only change made in the polymerization cycle and apparatus was the inclusion of cooler 61 within which a cooling water of 10° C. temperature was maintained. For the purpose of comparison, the temperature of ethylene gas leaving cooler 54, the temperature of the precompressor discharge gas, the temperature of the mixed stream prior to entry into cooler 61 and the temperature of gas leaving cooler 61 for entry into the hypercompressor were measured over a fourteen day period. The results are tabulated below in Table I.

TABLE I.—GAS TEMPERATURES IN ° C.

| Day | Cooler 54 Outlet | Precompressor Discharge | Combined Cooler 54 Outlet and Precompressor Discharge Inlet 61 | Outlet Cooler 61 |
|---|---|---|---|---|
| 1st | 30 | 16 | 23 | 23 |
| 3rd | 45 | 16 | 35 | 23 |
| 5th | 50 | 16 | 39 | 23 |
| 7th | 55 | 16 | 42 | 23 |
| 10th | 60 | 16 | 45 | 23 |
| 14th | 63 | 16 | 47 | 23 |

Table I illustrates the unexpected and ideal results obtained where temperature control of ethylene gas entering the hypercompressor is conducted in accordance with this invention. It will be noted that the introduction of the mixed gas stream into the cooler located at a loci subsequent to the mixing area for the gas streams results in the temperature of the gas remaining constant upon discharge from said cooler. This result is even more significant and amazing in view of the fact that the temperature of the gas stream entering the cooler continues to increase after daily operation of continuous polymerization.

In comparison to the production rate and hypercompressor capacity obtained in the procedure of Example I, the production rate for the entire cycle of fourteen days of operation using the procedure of Example II remained at a constant 845 pounds per hour and the hypercompressor capacity and reactor throughput increased to and remained constant at 6030 pounds per hour. It can be seen that the production rate using the process of this invention results in additional polymer production of at least 1560 pounds per day if, for example, production rate is calculated on the tenth day of continuous polymerization according to results obtained in Examples I and II.

FIGURE 4 graphically illustrates the comparison of temperature of ethylene gas entering the hypercompressor when temperature control and cooling was conducted in accordance with prior practice as represented by A and in accordance with this invention as represented by B. It will be noted that the introduction of the mixed gas stream into the cooler at continually rising temperatures does not cause an increase in temperature of the exiting gas stream.

I claim:

In a process for polymerizing ethylene to polyethylene by compressing ethylene in low and high pressure compressors and introducing said compressed ethylene containing a free radical yielding catalyst into one end of a reaction zone which has a substantial length and which is at a pressure range from 17,000 p.s.i.–40,000 p.s.i. and a temperature of at least 180° C. whereupon a substantial amount of the ethylene polymerizes to polyethylene and whereafter the ethylene which did not polymerize is separated from the polyethylene in two stages and two ethylene gas streams are produced, one of high pressure and the other of lower pressure for recycle to said reaction zone, cooling said streams adding fresh ethylene to the stream of lower pressure and compressing said stream of lower pressure containing said fresh ethylene to the pressure of the stream of high pressure and subsequently mixing said streams prior to compression in said high pressure compressor; the improvement which comprises subjecting the mixed stream, which is at the pressure of said stream of high pressure, to further cooling prior to compressing said stream to reaction zone pressure whereby said mixed stream is maintained at a constant temperature to thereby provide a constant ethylene gas capacity to said high pressure compressor.

References Cited by the Examiner

UNITED STATES PATENTS 2,820,779  1/1958  Dale _____ 260—94.9
3,184,444  5/1965  Eilbracht _____ 260—94.9

FOREIGN PATENTS 777,197  6/1957  Great Britain.

JOSEPH L. SCHOFER, *Primary Examiner.*

W. H. SHORT, *Examiner.*

F. L. DENSON, *Assistant Examiner.*